(12) United States Patent
Patel et al.

(10) Patent No.: US 7,817,964 B2
(45) Date of Patent: Oct. 19, 2010

(54) METHOD AND SYSTEM FOR ASSESSING WIRELESS COMMUNICATION QUALITY IN A COMMUNICATIONS NETWORK

(75) Inventors: Yogesh C. Patel, Bloomingdale, IL (US); Omar S. Refaqat, Plainfield, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 574 days.

(21) Appl. No.: 11/768,595

(22) Filed: Jun. 26, 2007

(65) Prior Publication Data

US 2009/0005119 A1    Jan. 1, 2009

(51) Int. Cl.
    *H04B 17/00* (2006.01)
(52) U.S. Cl. .................... 455/67.11; 455/507; 455/405; 455/422.1; 370/328
(58) Field of Classification Search .............. 455/67.11, 455/507, 513, 517, 67.13, 405, 406, 439, 455/422.1, 435.1, 436, 452.2, 456.1; 370/328, 370/332, 333, 401
    See application file for complete search history.

(56) References Cited

U.S. PATENT DOCUMENTS

| | | | |
|---|---|---|---|
| 5,657,375 A * | 8/1997 | Connolly et al. ............ 455/436 |
| 5,815,814 A * | 9/1998 | Dennison et al. ......... 455/456.2 |
| 6,298,233 B1 | 10/2001 | Souissi et al. |
| 6,459,695 B1 | 10/2002 | Schmitt |
| 6,522,888 B1 * | 2/2003 | Garceran et al. ......... 455/456.3 |
| 6,597,906 B1 | 7/2003 | Van Leeuwen et al. |
| 6,714,789 B1 | 3/2004 | Oh et al. |
| 6,751,443 B2 | 6/2004 | Haymes et al. |
| 7,215,969 B2 | 5/2007 | Benco et al. |
| 2002/0193104 A1 | 12/2002 | Scherzer et al. |
| 2007/0004394 A1 * | 1/2007 | Chu et al. ................. 455/422.1 |

* cited by examiner

*Primary Examiner*—Matthew D Anderson
*Assistant Examiner*—Shaima Q Aminzay
(74) *Attorney, Agent, or Firm*—Fay Sharpe LLP (57) ABSTRACT

Methods and systems are presented for assessing wireless communication quality in a communications network, in which a network application broadcasts reporting criteria to base stations in the network that requests reporting of RF signal strength from powered RF devices, and the base stations send messages to RF devices to request the RF devices to RF quality information according to the reporting criteria. The base station sends reported RF quality information to the network application, which processes the reported information to provide an assessment of RF network quality for all or a subset of the RF coverage areas served by the network.

23 Claims, 7 Drawing Sheets

CURRENT RF SIGNAL STRENGTH DATA BY LOCATION

| | 1 | 2 | 3 | 4 | 5 | 6 | 7 | 8 | 9 | 10 |
|---|---|---|---|---|---|---|---|---|---|---|
| 1 | 29.6 | 29.4 | 23.1 | 23.3 | 21.1 | 21.5 | 21.1 | 28.7 | 27.7 | 21.5 |
| 2 | 29.2 | 25.2 | 20.1 | 20.4 | 23.8 | 27.9 | 27.5 | 26.7 | 24.2 | 29.0 |
| 3 | 21.5 | 26.8 | 25.0 | 21.6 | 26.6 | 22.6 | 26.3 | 23.7 | 27.6 | 20.2 |
| 4 | 24.3 | 26.0 | 28.1 | 23.2 | 24.8 | 20.8 | 29.9 | 24.0 | 22.4 | 28.4 |
| 5 | 24.5 | 15.1 | 13.2 | 20.4 | 22.4 | 27.4 | 28.0 | 24.3 | 20.7 | 21.9 |
| 6 | 24.8 | 19.1 | 19.2 | 23.6 | 23.6 | 29.9 | 29.2 | 24.8 | 20.8 | 24.6 |
| 7 | 27.0 | 27.1 | 22.2 | 27.4 | 21.5 | 25.3 | 20.2 | 7.8 | 5.0 | 29.9 |
| 8 | 23.9 | 29.4 | 22.7 | 28.6 | 26.3 | 23.7 | 24.9 | 2.0 | 7.3 | 25.4 |
| 9 | 20.6 | 23.3 | 22.7 | 23.1 | 29.4 | 29.4 | 25.7 | 6.0 | 8.7 | 26.3 |
| 10 | 27.8 | 25.2 | 27.5 | 27.2 | 23.0 | 28.1 | 22.3 | 21.6 | 27.4 | 25.2 |
| 11 | 22.4 | 29.0 | 24.8 | 30.0 | 23.2 | 21.7 | 27.4 | 28.1 | 26.1 | 25.3 |
| 12 | 28.6 | 25.3 | 23.2 | 20.6 | 26.4 | 29.9 | 21.9 | 24.6 | 29.5 | 25.8 |
| 13 | 15.1 | 12.7 | 27.5 | 23.9 | 28.7 | 23.5 | 23.2 | 24.7 | 27.1 | 29.2 |
| 14 | 17.7 | 20.9 | 25.0 | 26.7 | 23.3 | 25.5 | 26.2 | 21.7 | 22.7 | 21.3 |
| 15 | 27.3 | 26.7 | 26.6 | 25.6 | 25.2 | 27.8 | 23.0 | 24.3 | 29.3 | 20.2 |
| 16 | 25.5 | 21.8 | 25.1 | 29.4 | 24.9 | 29.5 | 22.1 | 26.4 | 20.9 | 21.9 |
| 17 | 28.2 | 23.8 | 24.8 | 34.8 | 38.2 | 24.4 | 22.6 | 27.3 | 20.5 | 22.5 |
| 18 | 24.4 | 23.3 | 29.5 | 40.0 | 31.4 | 21.0 | 29.4 | 26.2 | 27.3 | 26.0 |
| 19 | 20.4 | 26.4 | 22.7 | 23.4 | 28.0 | 24.2 | 27.3 | 23.7 | 28.6 | 29.5 |
| 20 | 27.0 | 28.0 | 22.3 | 21.5 | 20.1 | 22.9 | 20.2 | 25.4 | 23.9 | 28.4 |

METHOD AND SYSTEM FOR ASSESSING WIRELESS COMMUNICATION QUALITY IN A COMMUNICATIONS NETWORK

FIELD OF THE INVENTION

This invention relates generally to the field of telecommunication systems, and more particularly to RF grid development and network optimization in wireless communications systems.

BACKGROUND OF THE INVENTION

Wireless communication allows people to communicate to or from any given location, wherein wireless customers may select from an array of useful ancillary services to augment the advantages of mobile telecommunications. Wireless service providers create and maintain vast wireless networks to support such communications services for subscriber customers, and strive to maximize network utilization and the attendant revenues generated by providing uninterrupted wireless service for subscribers, while also attempting to minimize operating costs and mitigate dropped calls and other service problems. In this regard, wireless service providers have found that allowing too many calls to be dropped will upset subscribers and may lead to revenue losses and may hinder efforts to attract new subscribers. Efficiently maintaining and engineering radio frequency (RF) network with respect to the quality of RF communications signals and equipment is thus an important aspect of wireless network operation.

In general, wireless networks consist of a number of geographic regions referred to as cells, where wireless RF communications within each cell is provided by a base station that communicates with cell phones and other wireless user equipment currently located within the cell. The base station generally includes a base transceiver station and a base station controller that are operative to communicate with devices in a given sector of the sell on one or more channels or frequencies for various band classes. One or more base stations are typically served by a switching system such as a mobile switching center (MSC) that operates in conjunction with a visitor location register (VLR) database and a home location register (HLR) database to support communications services for RF devices communicating with the associated base station(s).

In the past, wireless service providers have tried various techniques to assess the RF network performance of a given area. However, these techniques have thus far provided only partially complete information, and the assessment of the actual wireless communications quality is largely based on assumptions, whereby the information is often of only marginal vale in deciding whether to adjust or upgrade the equipment serving a given location. One such technique employs RF prediction software that inputs the topology and geography of an area, the base station location and transmit power, street and building locations, and predicts what a wireless device might experience at different locations. This approach, however, is often able to predict the RF performance of a given area with only marginal accuracy. Another method involves a set of test RF devices that are driven around the mobile network to gather data on the RF environment encountered during the test. This approach can be used to generate a plot of the area to indicate certain aspects of the RF environment for the locations at which the data was collected. This technique suffers from the high cost of moving the test apparatus around within the tested area, and the time needed to collect and plot the data. Another technique uses measurements collected at the mobile network on the current state of the system and its different components in order to characterize the network quality. Such measurements may be used to draw very general conclusion about the RF environment, but specific analysis of actual RF conditions are not possible using this methodology. Thus, the conventional RF quality assessment techniques are of limited value in attempting to trouble-shoot RF network conditions or to determine whether adjustments or upgrades are needed, and there is an ongoing need for improved methods and systems for assessing the quality of RF communications links in a wireless communications system for use in grid development and network optimization.

SUMMARY OF THE INVENTION

The following is a summary of one or more aspects of the invention to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter. The various aspects of the present disclosure relate to RF grid development and network optimization in wireless communications systems and assessment of RF communications quality using reports from individual wireless user equipment. Methods and systems are presented for assessing wireless communication quality in a communications network, in which a network application broadcasts reporting criteria to base stations in the network that requests reporting of RF signal strength from powered RF devices, and the base stations send messages to RF devices to request the RF devices to obtain and report RF quality information according to the reporting criteria. The base station sends reported RF quality information to the network application, which processes the reported information to provide an assessment of RF network quality for all or a subset of the RF coverage areas served by the network. In certain embodiments, short messaging network components can be used to send the broadcast and/or reporting messages. The aspects of the disclosure may be advantageously employed to provide a comprehensive view of RF coverage area by data acquisition that can be managed according to various levels of data collections while the reporting RF devices are idle or servicing a call, where service provider applications in the network can set the requested report criteria to control the quantity and content of the reporting via configurable broadcast reporting criteria to initiate control channel messaging. The network operator/service provider can thus tailor the data acquisition parameters according to the network quality assessment desired either manually or through a network application so as to facilitate making decisions regarding grid development and/or network optimization. Moreover, the assessment may be used in closed loop fashion for automatic adjustment of system parameters affecting the RF performance of the network.

According to one or more aspects of the present disclosure, a wireless communications network is provided, including a plurality of switching systems, such as MSCs in one example, which are operatively associated with one or more base stations for providing communications services to wireless RF devices. The communications network further includes a network application which broadcasts reporting criteria to base stations via the associated switching systems. The reporting criteria is used by the base stations to generate messaging to request RF signal strength reports from RF devices. The reporting criteria broadcast by the network application in certain embodiments may further indicate specified network cells and sectors for which reports are to be requested, one or more mobile ID numbers for RF devices from which reports are to be requested, one or more frequencies for which reports are to be requested, and/or one or more band classes for which reports are to be requested. In addition, the criteria may request a single report or may specify periodic reporting at a controllable period. The base station returns the reported RF quality information to be processed by the network application so as to provide an assessment of RF signal quality at all or a subset of the RF coverage area in the network. In accordance with further aspects, short messaging can be used for sending the requested reporting criteria and/or for the reporting by the RF devices. The reported RF quality information may include the location of the reporting RF devices, either through the RF devices determining and reporting their own locations along with the RF signal strength measurements, and/or by the network performing triangulation to determine the location of the reporting RF devices. The network application, moreover, may selectively adjust system parameters affecting the RF performance and/or adjust the reporting criteria itself according to the assessment and broadcast the adjusted reporting criteria to base stations in the network to request adjusted reporting of RF signal strength from powered RF devices in the communications network.

Further aspects of the disclosure relate to a method for assessing wireless communication quality in a communications network. The method comprises broadcasting reporting criteria to base stations requesting reporting of RF signal strength from powered RF devices in the communications network, and sending a message requesting RF devices to report RF quality information to at least one base station according to the reporting criteria. The method further includes receiving reported RF quality information from reporting RF devices, and processing the reported RF quality information to provide an assessment of RF network quality for all or a subset of the RF coverage areas served by the network. In certain embodiments, the RF quality information received by the base stations includes the location of the reporting RF devices, or the network may perform triangulation to determine the location of the reporting RF devices, and report the quality information to a network application with the RF device locations. The broadcast reporting criteria may further specify cells and sectors of the network for which reports are to be requested, mobile ID numbers for RF devices from which reports are to be requested, frequencies and/or band classes for which reports are to be requested, as well as indicating whether a single report or periodic reports are desired. The method, moreover, may further include selectively adjusting the reporting criteria according to the assessment and broadcasting the adjusted reporting criteria to request adjusted reporting of RF signal strength from powered RF devices in the network, alone or in combination with adjusting the system parameters impacting the RF performance based at least in part on the assessment.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages, and novel features of the invention will become apparent from the following detailed description of the invention when considered in conjunction with the drawings, in which.

DETAILED DESCRIPTION OF THE INVENTION

Figure 1A:
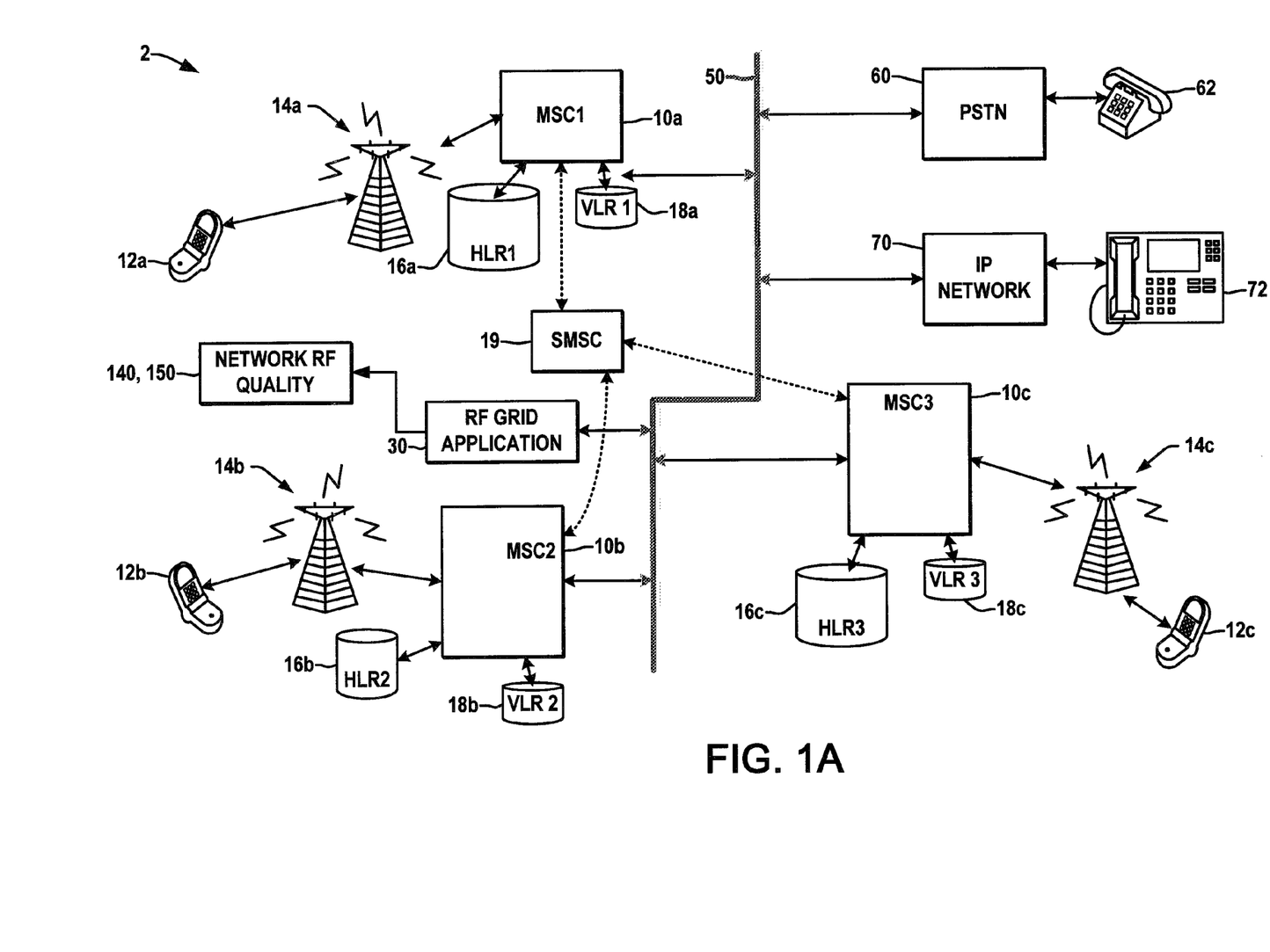
FIG. 1A is a system level diagram illustrating a telecommunications network or system with a network application that provides an assessment of network RF quality by requesting reports from power RF devices and also operates to automatically adjust RF performance parameters and requested reporting criteria according to the RF quality assessments in accordance with one or more aspects of the present disclosure.
Figure 1B:
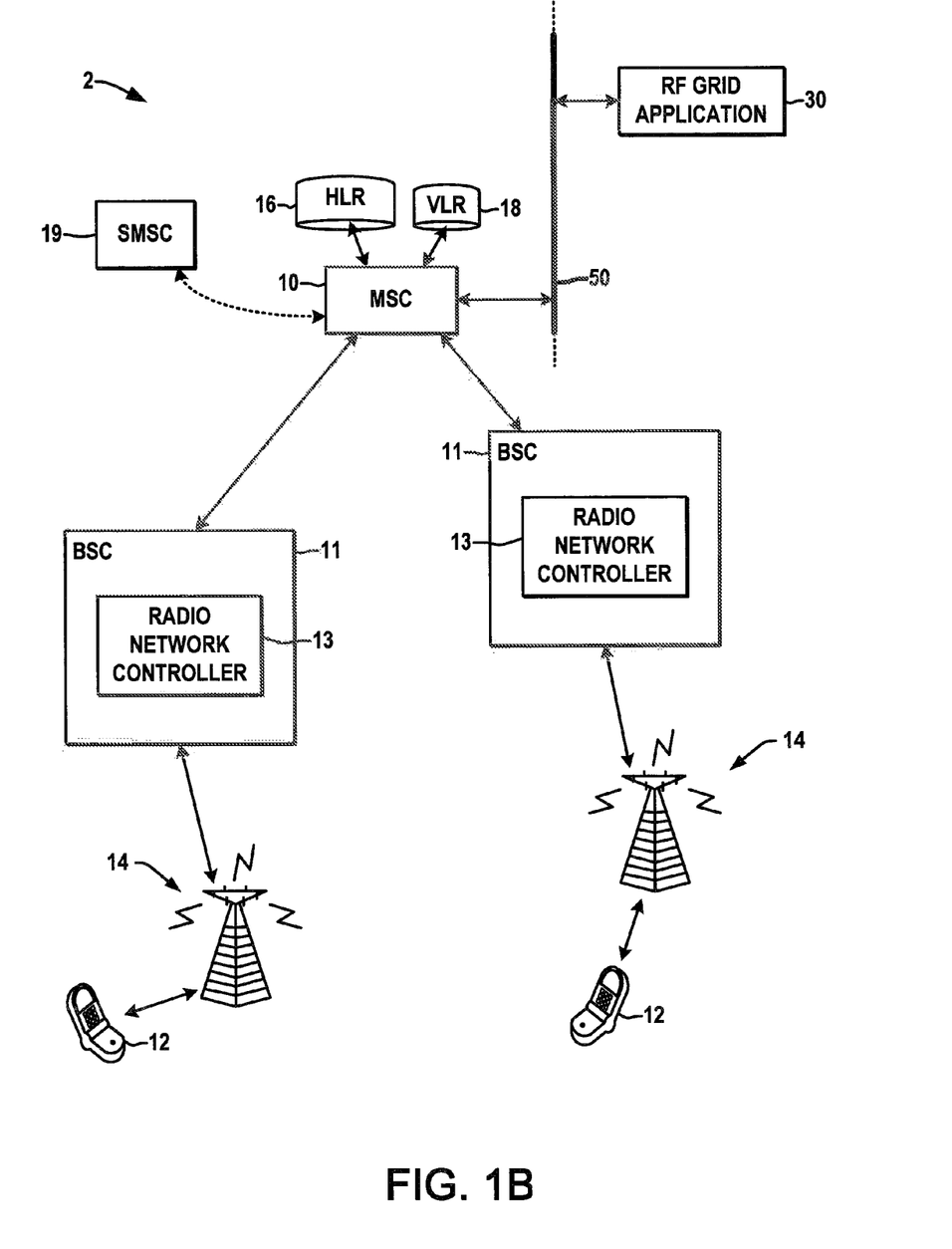
FIG. 1B is a partial system level diagram illustrating two exemplary base stations and an associated switching system in the network of FIG. 1A.

Referring now to the figures, several embodiments or implementations of the various aspects of the present disclosure are hereinafter illustrated and described in conjunction with the drawings, wherein like reference numerals are used to refer to like elements. FIGS. 1A and 1B show an exemplary communications system or network 2 in which various aspects of the invention may be carried out to provide an assessment of network RF quality using signal strength and position information obtained from RF devices 12 within the network 2. The system 2 includes a plurality of switching systems such as mobile switching centers (MSCs) 10 interconnected with one another via a network 50 and connected to other telecommunications components via additional networks 60 and 70 to allow various telephones, RF devices, computers, digital assistants, etc. to communicate with one another for exchange or transfer of voice, short text messages, and/or data or other information therebetween. The network 2 also supports SMS short messaging to and from the RF devices 12 via one or more short message service centers (SMSCs 19 operatively coupled with the MSCs 10. In the exemplary system 2, calls may be placed between calling and called parties using various land-line user equipment (UE) 62, 72, and wireless devices 12, where the devices 12, 62, and 72 are operatively coupled with call control elements and one or more networks 50, 60, 70 formed by operative interconnection of various network elements including the MSCs 10 as are known, wherein three exemplary MSCs 10a-10c are illustrated in FIG. 1, although any number of these may be interconnected in a given system. The system 2 can include any type or types of communications networks and network elements, including but not limited to a Public Switched Telephone Network (PSTN) 60 for communication with one or more land-line telephones 62, mobile networks for communicating via RF devices 12, IP-networks 70 for communications using VoIP phones 72, computers, or other IP-based devices, and combinations thereof, wherein the various network elements are operatively associated with one another to allow communications therebetween and therethrough with respect to data and control signaling or messaging.

The MSC type mobile switching or call control elements 10 perform normal switching and call control functions for wireless calls to and from other telephone and data systems, with associated Home Location Registers (HLRs) 16 and Visitor Location Registers (VLRs) 18, and further support short message services for the RF devices 12 via the SMSC 19. The HLRs 16 in general provide a database used for storage and management of customer subscriptions and service profiles to facilitate routing calls to and from indicated subscribers, and the VLRs 18 provide a database storage and access functionality with respect to temporary information about roaming subscribers such that the MSCs 10 can service visiting wireless units 12. In general, the switching systems 10, HLRs 16, VLRs 18, and SMSCs 19, etc. can be any suitable hardware, software, combinations thereof, etc., which are operatively coupled with the network 50 to provide call service and short message functionality as is known, including but not limited to routing and control functions, as well as the network RF quality assessment and reporting functionality illustrated and described further herein.

The switching systems 10, HLRs 16, and the functionality thereof may be implemented in integrated entities or may be distributed across two or more entities in the system 2, for instance, where the elements 10 and 16 may themselves be integrated with one another or separate. The exemplary MSCs 10 preferably include memory and processing elements (not shown) for storing and executing software routines for processing and switching calls as well as for providing various call features to calling or called parties, and further provide for receipt of broadcast reporting criteria 110 from a network application 30, messaging to associated base stations 14 to request reporting of RF signal strength quality information by RF devices 12 according to the desired reporting criteria 110, and forwarding reported quality information to the network application 30, as well as optional triangulation to determine the location of reporting RF devices 12, and optional time stamping of reported quality information to facilitate assessment of RF network quality by the network application 30, where short messages may be used in certain implementations to send desired reporting criteria to the RF devices 12 and/or to receive signal strength reports from the RF devices 12. The switching elements 10 are generally operative with any suitable circuit, cell, or packet switching and routing technologies, including but not limited to Internet Protocol (IP) and Asynchronous Transfer Mode (ATM) technologies, etc., and are operatively interconnected by bearer and control traffic links (not shown) to accommodate exchange or transfer of bearer traffic (e.g., voice, video, or image data, etc.) as well as control traffic (e.g., inter-node signaling in accordance with SS7 ISDN User Part (ISUP) or SIP protocols, etc.), respectively, wherein such links may be logical links implemented, for example, as T1 carrier, optical fiber, ATM links, wireless links, and the like.

The MSC switching systems 10 are interoperable with various forms of wireless RF devices 12 using the base stations 14 for calls and associated messages and also for supporting short message services, wherein three exemplary wireless phones 12a, 12b, and 12c are shown in FIG. 1 for ease of illustrating the various aspects of the invention. Any form of wireless and landline devices 12, 62, 72 may interface with the system 2 via the base stations 14, the MSCs 10, and networks 50, 60, 70 for placing or receiving calls, for example, wireline or Plain-Old-Telephone-Service (POTS) phones 62 communicating via the PSTN 60, wireless communication devices such as mobile phones 12 and/or personal digital assistants (PDAs), pagers, computers with wireless interfaces, or other wireless devices communicating via one or more of the MSCs 10, and IP-based devices, such as computers, VoIP phones 72, etc. interacting via the IP network 70. The operative coupling of the wireless phone user equipment 12 with the MSCs 10 may be of any suitable form, for example, including base station system (BSS) equipment 14 providing radio-related functions, where the base stations 14 preferably comprise base station controllers (BSCs) or radio network controllers 11 and base transceiver stations (BTSs) or radio network controllers 13, schematically illustrated in FIG. 1B, to transfer voice and data traffic between the RF devices 12 and the MSCs 10, as well as support for SMS services. In the illustrated system 2, a first switching system 10a is the home MSC for a subscriber associated with the RF device 12a, and the MSC 10a is operatively coupled with the network 50 to provide communications service to any number of wireless units 12 including the exemplary first RF device 12a. The MSC 10a is operatively coupled with a first home location register 16a that stores subscription information relating to the wireless calling party user equipment 12a, and a VLR18a is also provided, to facilitate the MSC 10a providing communications services to roaming wireless RF devices 12. Similarly, a second MSC 10b is also operatively coupled with the network 50 to provide communications service to a RF device 12b using base station system 14b, HLR16b, and VLR18b, where the MSC 10b is currently serving the device 12b and may, but need not be, the home MSC for the RF device 12b. A third exemplary MSC 10c is also shown in the system 2, coupled with an HLR16c, a VLR18c, and a base station 14c for servicing a RF device 12c.

Figure 2:
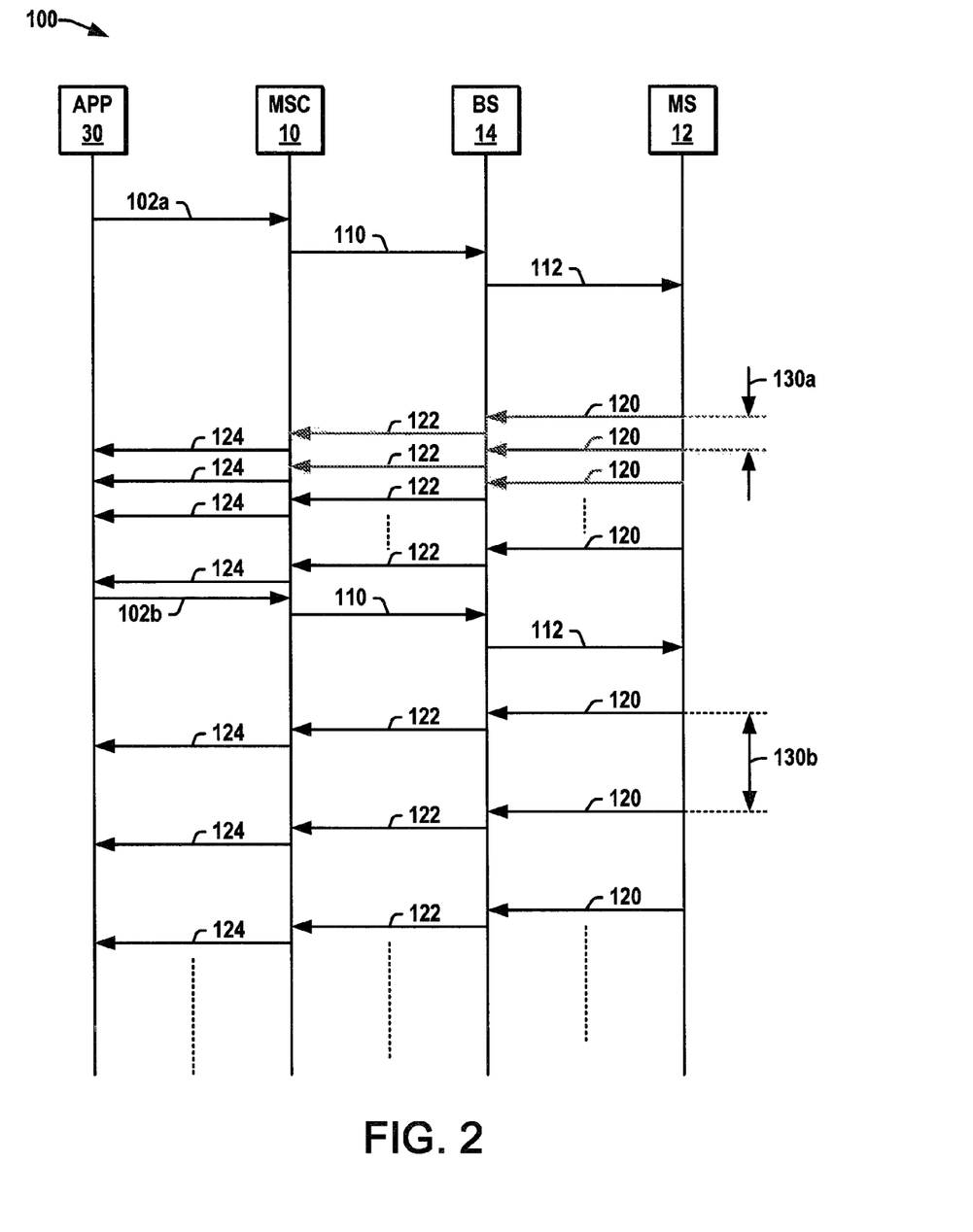
FIG. 2 is a message flow diagram illustrating exemplary broadcasts of reporting criteria and responsive base station and RF device messaging to report RF quality information to the network application for generating an RF quality assessment in the network of FIGS. 1A and 1B.
Figure 3:
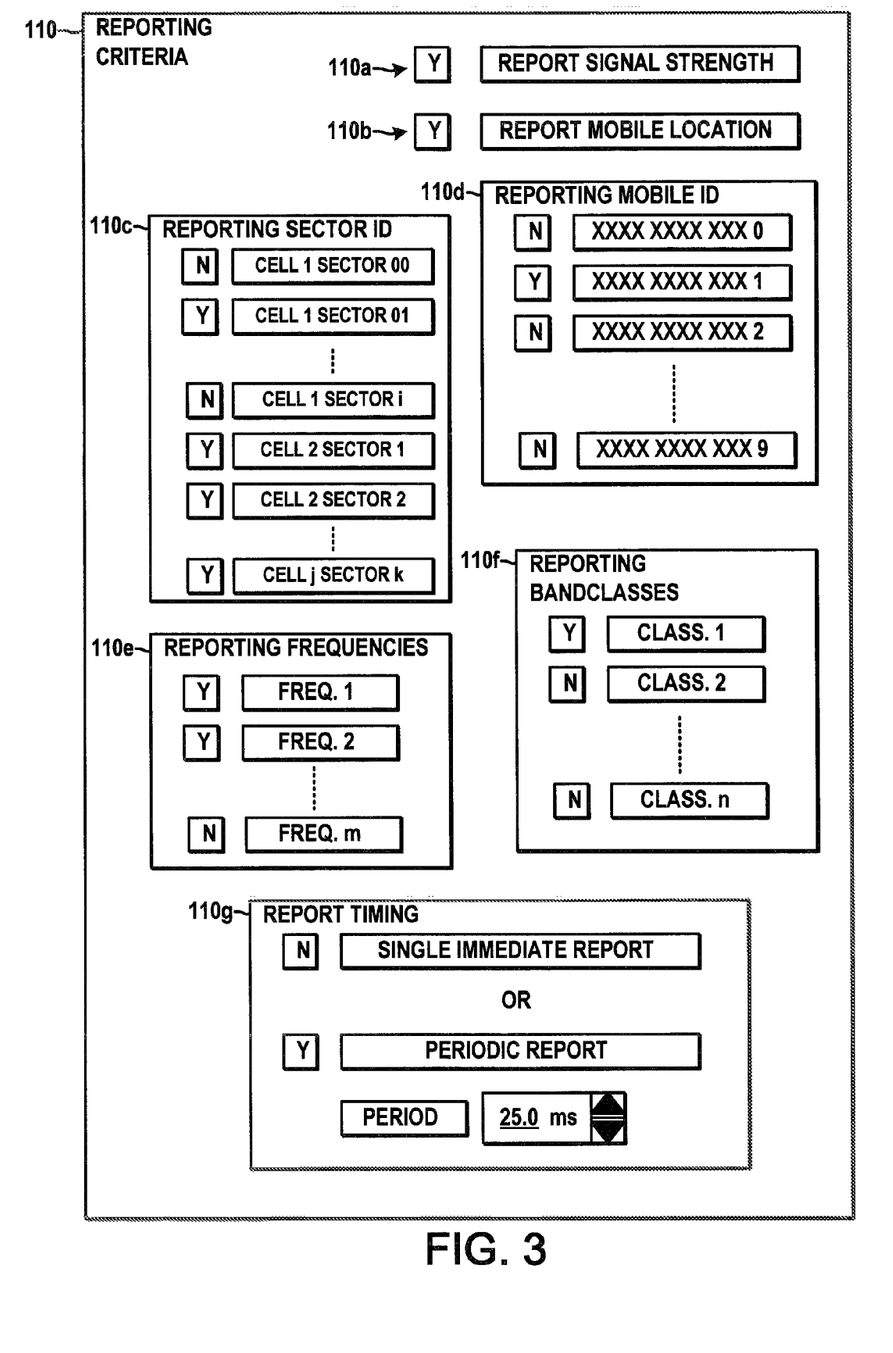
FIG. 3 is a schematic diagram illustrating an exemplary reporting criteria broadcast to MSCs and base stations by the network application.

Referring also to FIGS. 2 and 3, in operation, the presently disclosed systems and methods advantageously provide for assessment of wireless communication quality in the wireless portions of the communications system 2 by the network application 30 broadcasting reporting criteria to the base stations 14 via the MSC switching system 10 to request reporting of RF signal strength from powered RF devices 12 currently in the system 2, whether currently on a call or not. Initially, the network application 30 sends a broadcast network message 102 (FIG. 2) to the MSCs 10 that includes reporting criteria 110 (FIG. 3) specifying the desired level and type of RF quality information reporting to be performed, where the broadcast can be one or more SMS messages in certain embodiments. As further shown in FIG. 2, the MSCs 110 may simply forward the desired reporting criteria 110 to the associated base stations 14, or may selectively send the criteria 110 only to base stations 14 that service the specified cells and sectors (110c in FIG. 3). The base stations 14, in turn, send messages 112 (e.g., Paging Channel Broadcast Message or similar forward link message, or SMS messages) to the powered RF devices 12 to request the RF devices 12 to report the current RF quality in accordance with the specified criteria 110. In this manner, the powered RF devices 12 (or some selected subset thereof) can operate to measure and report the local RF network quality regardless of whether they are currently servicing a call. Examples of suitable signal strength measurements and messaging are described in the following U.S. patents, the entireties of which are hereby incorporated by reference as if fully set forth herein: Benco et al. U.S. Pat. No. 7,215,969, issued May 8, 2007; Schmitt U.S. Pat. No. 6,459,695, issued Oct. 1, 2002; and Garceran et al. U.S. Pat. No. 6,522,888, issued Feb. 18, 2003, and SMS messages may also be used. The RF devices 12 respond with suitable messages 120 to the base stations 14 that include the measured RF signal strength and may optionally include the location of the reporting RF device 12, such as for GPS equipped devices 12, if requested to do so by the messaging. In another embodiment, the network 2 may perform triangulation by interpreting RF device reporting messages received at three or more base stations to ascertain the location of some or all of the reporting RF devices 12. Moreover, the RF devices 12 may employ mobile originated SMS messaging to report the signal quality information via the base stations 14, the MSCs 10, and the SMSC 19.

As best shown in FIG. 2, the base stations 14 send reported RF quality information 122 to the corresponding MSCs 10, which in turn send the reported RF quality information via network messages 124 to the network application 30. The network application 30 then processes the reported information 124 to provide an assessment 140, 150 (FIGS. 1, 4A, and 4B) of RF network quality for all or a subset of the RF coverage areas served by the network 2 using any suitable processing techniques. In one example, the assessment 140, 150 can provide a comprehensive view of RF network signal quality for all or a portion of the wireless coverage area in the system 2, where the specification by the application 30 of the desired reporting criteria 110 in the broadcast messages 102 allows the data collection to be managed according to various levels of data collection parameters as defined by the application 30. By this arrangement, a wireless service provider or network operator can control the requested report criteria via control channel messaging to thereby tailor the data acquisition parameters according to the network quality assessment desired, either manually or through the network application 30, to thereby aid in making decisions regarding grid development and/or network optimization or other applications.

FIG. 3 shows one possible example of desired quality information reporting criteria 110 as set manually by a network operator running the network application 30, or which may be generated automatically by logic in the application 30. In this example, the criteria 110 includes a selection 110a specifying whether the signal strength is to be reported by the RF devices 12, as well as a selection 110b indicating whether the RF device location is to be reported. In certain possible embodiments, the reporting criteria 110 specifies cells and sectors 110c for which reports are to be requested, wherein the associated base stations 14 may generate the suitable messages for specified cells and sectors while refraining from sending report request messages for unspecified sectors and cells. The reporting criteria, moreover, may specify, via an indication 110d, one or more mobile ID numbers for RF devices 12 from which reports are to be requested. In the example in FIG. 3, this may be accomplished by selecting only those RF devices 12 having a mobile ID number ending with "2", so as to effectively limit the number of responses 120 (and the associated traffic) on average to about ten percent of the devices 12. The exemplary reporting criteria 110 also provides selective specification of certain channels or frequencies 110e to further tailor the reporting to one or more frequencies of interest to an operator or to the logic of the network application 30, and 110 may further specify certain band classes of interest 110f.

The reporting criteria 110 may also specify a single report or periodic reports 110g, where the period 130 may also be manually or programmatically adjusted via the application 30. In this regard, FIG. 2 illustrates one possible situation in which the application 30 initially requests periodic reporting (via the PERIODIC REPORT setting 110g in FIG. 23) in a first broadcast 102a to the MSCs 10 at a first period 130a, after which the RF devices 12 send report messages 120 at the specified period 130a. At some point, the program 30 may adjust the reporting period via another broadcast 102b to the MSCs 10 that specifies a second (e.g., longer) period 130b. Thereafter, the RF devices 12 send subsequent reports 120 at the second period 130b. Periodic reporting may be implemented by the base stations 14 sending broadcast messages 112 at the specified period 130 (not shown in FIG. 2) or other mechanisms can be used by which the RF devices 12 report a signal strength measurement at the requested period 130. The application 30 may also optionally operate to selectively adjust the reporting criteria 110 according to the assessment 140, 150 and broadcast the adjusted reporting criteria 110 to base stations in the network to request adjusted reporting of RF signal strength from powered RF devices 12 in the communications network 2. In this respect, the criteria 110 may be adjusted in any number of different ways, one of which is adjustment of the reporting period 130 as depicted in FIG. 2 (e.g., 110g in FIG. 3). Other possible examples include other changes to the timing of the reporting (e.g., change from periodic to single report), changes to the cells and sectors (110c in FIG. 3) for which reports are sought, changes to the mobile ID numbers from which reports are requested (110d in FIG. 3), changes to the frequencies for which reports are to be requested (110e in FIG. 3), and/or changes to the list of reported band classes (110f in FIG. 3), any of which may be adjusted manually or programmatically via the network application 30, wherein the adjustments in one embodiment may be made at least partially according to the RF quality assessment 140, 150.

Figure 4A:
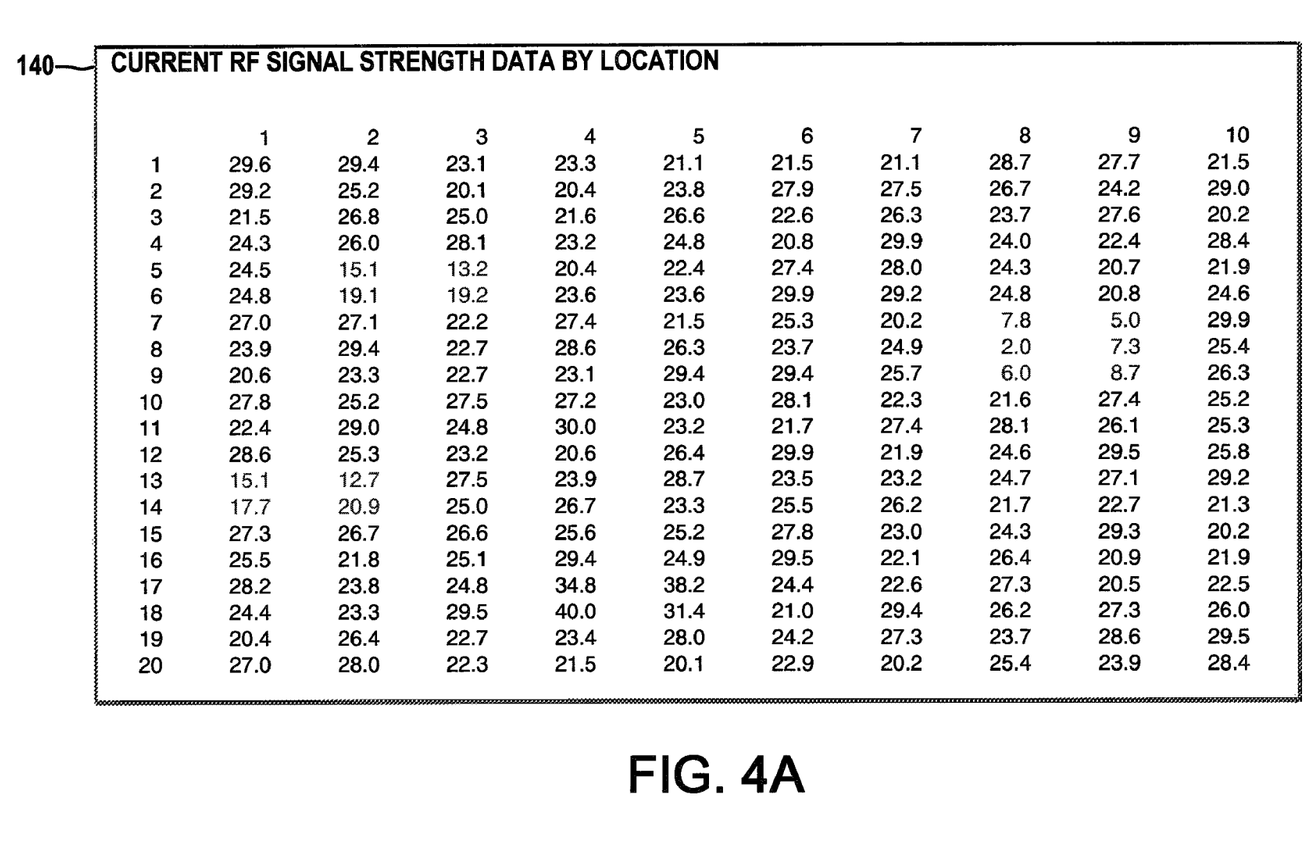
FIG. 4A is a schematic diagram illustrating an exemplary RF quality assessment in tabular form including RF signal strength data by location in the network.
Figure 4B:
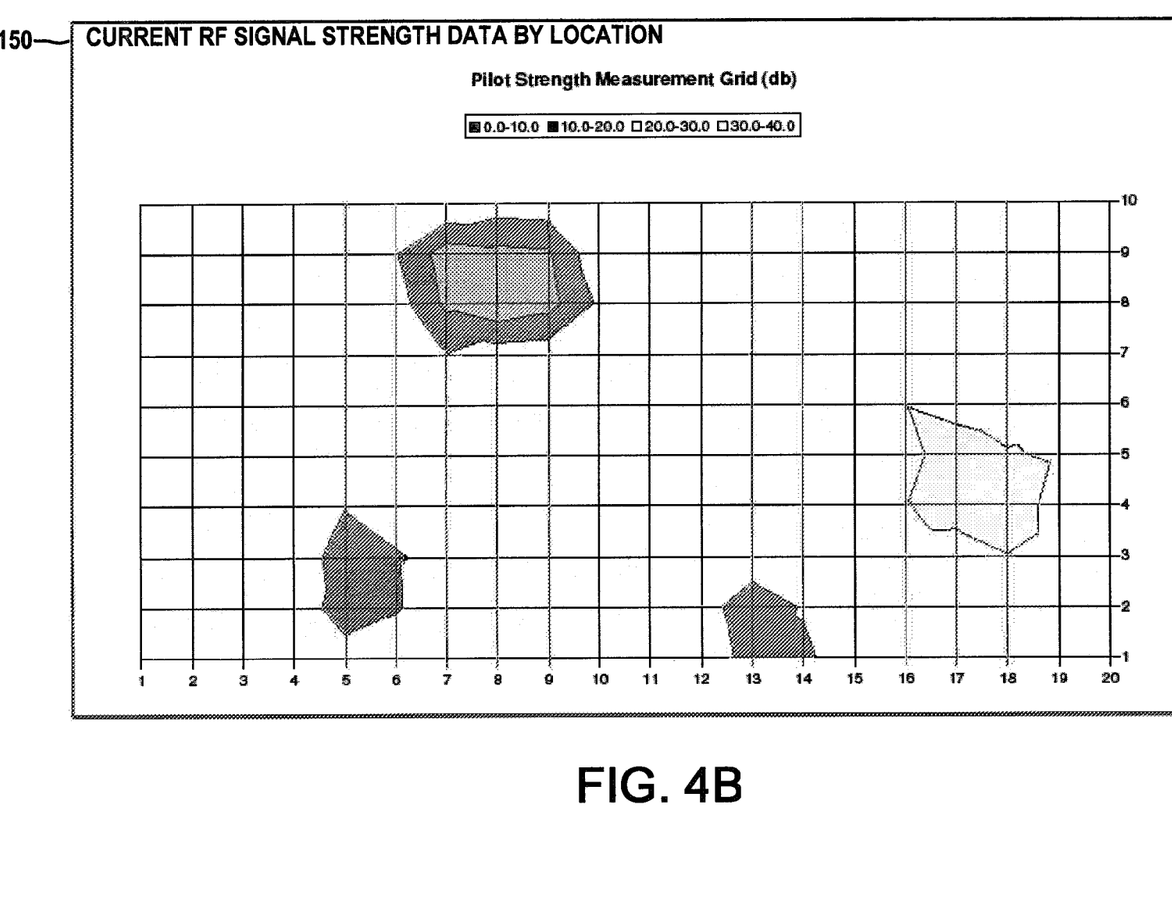
FIG. 4B is a schematic diagram illustrating an exemplary signal strength plot assessment showing RF signal strength by location in the network.

The network application 30 may be any hardware, software, or combinations thereof, which is operatively coupled with the network 50 to broadcast the desired RF quality reporting criteria 110 to one or more base stations 14 via the MSCs 10, and which receives the reported RF quality information from the network 50. The application 30 processes the reported quality information to generate one or more assessments, two possible examples of which are depicted in FIGS. 4A and 4B. FIG. 4A illustrates one possible accumulation of RF signal strength data processed by the network application 30 to provide an exemplary tabular RF quality assessment 140 including RF signal strength data by location in the network 2. In another example, the application 30 may provide an assessment 150 as shown in FIG. 4B that includes a plot showing RF signal strength for a plurality of locations served by the network 2. As noted above, because the broadcast reporting criteria 110 provides a rich set of tunable reporting parameters and settings, the RF quality information can be acquired across a number of different performance dimensions, thereby allowing finely detailed assessments 140, 150 according to any required degree of specificity. This, in turn, facilitates the employment of the assessment(s) 140, 150 in a variety of applications, including but not limited to grid development, network optimization, trouble shooting, etc.

Figure 5:
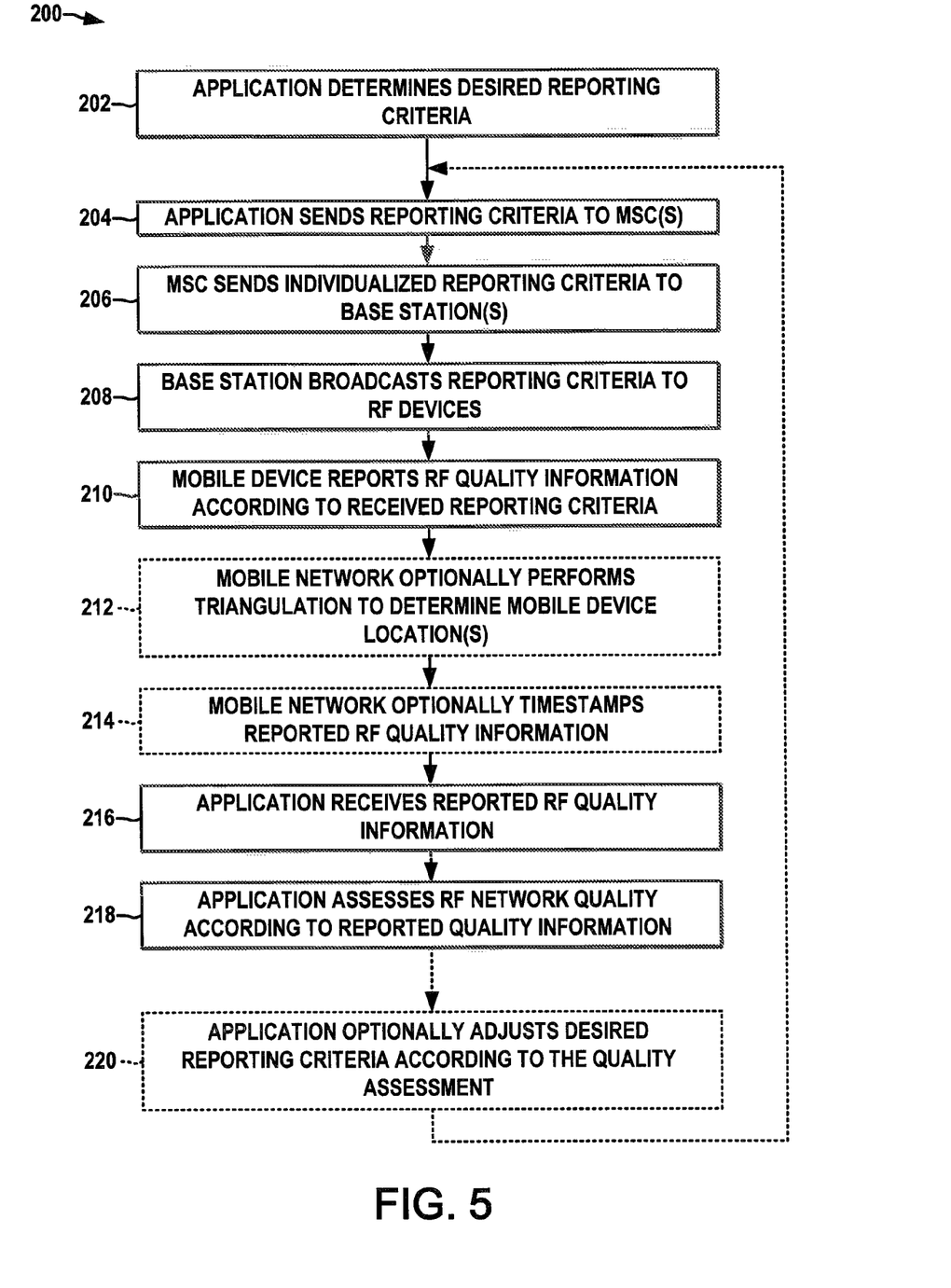
FIG. 5 is a flow diagram illustrating an exemplary method of assessing wireless communication quality in a communications network in accordance with further aspects of the invention.

Referring now to FIG. 5, an exemplary method 200 is illustrated for assessment of wireless communication quality in a communications network in accordance with one or more additional aspects of the present disclosure. While the exemplary method 200 is illustrated and described in the form of a series of acts or events, it will be appreciated that the various methods of the invention are not limited by the illustrated ordering of such acts or events except as specifically set forth herein. In this regard, except as specifically provided hereinafter, some acts or events may occur in different order and/or concurrently with other acts or events apart from those acts and ordering illustrated and described herein, and not all illustrated steps may be required to implement a process or method in accordance with the present invention. The illustrated method 200 and other methods of the invention, moreover, may be implemented in hardware, software, or combinations thereof, in order to provide the RF quality assessment features as described herein, wherein these methods can be practiced in hardware and/or software of the above described system or network 2, or other systems or alternate forms of logic, hardware, or software in any single or multiple entities operatively associated with a wireless network 2, wherein the invention is not limited to the specific applications and implementations illustrated and described herein.

The method 200 begins at 202 with the network application (e.g., RF grid application 30 in FIGS. 1A and 1B) determining desired reporting criteria (e.g., criteria 110 in FIG. 3 above). As described supra, the criteria 110 may be set at 202 manually or programmatically via the network application 30 to facilitate RF network quality data acquisition and quality assessment generation for a variety of different band classes, frequencies, specific locations (e.g., cell and sector), periodic report timing, etc. The application then sends the reporting criteria to one or more MSCs at 204, wherein any suitable network messaging may be used for sending the reporting criteria at 204, and SMS type messaging may be used alone or in combination with other network messages. At 206, the MSCs send individualized reporting criteria to the associated base stations by any suitable messaging techniques, wherein the MSC in one example may selectively send the reporting criteria only to base stations associated with cells and sectors for which reporting was specified in the reporting criteria. In one possible implementation, the base stations at 208 send individualized paging channel broadcast messages or other suitable messaging via the wireless RF communications thereof to set the device reporting for powered RF devices in the network, and the RF devices report RF quality information at 210 according to the received reporting criteria. In other embodiments, the base stations send SMS messaging to the RF devices to set the RF device RF quality information reporting, and the devices 12 may report this information via short messages.

The RF devices may optionally report their current location (e.g., longitude, latitude) at 210, for example, for GPS equipped RF devices, or the network may optionally perform triangulation at 212 to determine the locations of reporting RF devices. In addition, the network may optionally timestamp the reported RF quality information at 214. The network application receives the reported RF quality information at 216, which optionally includes the reporting device locations and timestamps, and the application assesses the network RF quality at 218 according to the reported quality information. In one example, the application provides an assessment (e.g., assessments 140 and 150 in FIGS. 4A and 4B above) by processing all or a portion of the received quality information. In accordance with a further aspect of the disclosure, the network application may optionally adjust the desired reporting criteria at 220 according to the network quality assessment, and thereafter broadcast the adjusted criteria at 204 for obtaining further reports from the RF devices in the network or a subset thereof. Moreover, the application 30 may advantageously store the assessments 140, 150 and/or the reported RF quality information to generate assessments that show changes in network quality over time.

Although the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The invention claimed is:

1. A method for assessing wireless communication quality in a communications network having a plurality of networked switching systems and base stations for providing wireless communications services to wireless RF devices, the method comprising:
   broadcasting, by a network application to base stations in the network, reporting criteria requesting reporting of RF signal strength from powered RF devices in the communications network;
   sending, from at least one base station to powered RF devices in the network, a message requesting RF devices in an area served by the at least one base station to report RF quality information to the at least one base station according to the reporting criteria;
   receiving, at the at least one base station from at least one reporting RF device, RF quality information including RF signal strength measured by the at least one reporting RF device;
   receiving at the network application from the at least one base station, reported RF quality information from at least one reporting RF device; and
   processing the reported RF quality information for a plurality of locations served by the network to provide an assessment of RF network quality for at least a subset of the RF coverage areas served by the network.

2. The method of claim 1, wherein the reported RF quality information includes the location of the at least one reporting RF device, and wherein the RF quality information received by the at least one base station includes the location of the at least one reporting RF device.

3. The method of claim 1, wherein the reported RF quality information includes the location of the at least one reporting RF device, and wherein the network performs triangulation to determine the location of the at least one reporting RF device.

4. The method of claim 1, wherein broadcasting the reporting criteria includes specifying cells and sectors of the network for which reports are to be requested.

5. The method of claim 1, wherein broadcasting the reporting criteria includes specifying one or more mobile ID numbers for RF devices from which reports are to be requested.

6. The method of claim 1, wherein broadcasting the reporting criteria includes specifying one or more frequencies for which reports are to be requested.

7. The method of claim 1, wherein broadcasting the reporting criteria includes specifying at least one band class for which reports are to be requested.

8. The method of claim 1, wherein broadcasting the reporting criteria includes specifying a single report or periodic reports.

9. The method of claim 1, wherein the assessment includes a plot showing RF network quality for a plurality of locations served by the network.

10. The method of claim 1, further comprising the network application selectively adjusting the reporting criteria according to the assessment and broadcasting the adjusted reporting criteria to base stations in the network to request adjusted reporting of RF signal strength from powered RF devices in the communications network.

11. The method of claim 1, further comprising selectively adjusting system parameters impacting RF performance according to the assessment.

12. The method of claim 1, wherein the network application broadcasts the reporting criteria to the RF devices using at least one short message and wherein the at least one reporting RF device send the RF quality information using short messages.

13. A wireless communications network, comprising:
a plurality of switching systems operatively associated with one or more base stations for providing communications services to wireless RF devices;
a network application operatively coupled with the switching systems, the application broadcasting reporting criteria to base stations in the network via associated switching systems, the reporting criteria specifying immediate or periodic reporting of RF signal strength from powered RF devices;
wherein at least one of the base stations sends a message to powered RF devices requesting RF devices in an area served by the at least one base station to report RF quality information to the at least one base station according to the reporting criteria, and receives RF quality information from at least one reporting RF device, wherein the at least one base station sends reported RF quality information to the network application via the associated switching system, and wherein the network application processes the reported RF quality information for a plurality of locations served by the network to provide an assessment of RF network quality for at least a subset of the RF coverage areas served by the network.

14. The network of claim 13, wherein the network application selectively adjusts the reporting criteria according to the assessment and broadcasts the adjusted reporting criteria to base stations in the network to request adjusted reporting of RF signal strength from powered RF devices in the communications network.

15. The network of claim 13, wherein the reported RF quality information includes the location of the reporting RF devices, and wherein the network performs triangulation to determine the location of the at least one reporting RF device.

16. The network of claim 13, wherein the reporting criteria specifies cells and sectors of the network for which reports are to be requested.

17. The network of claim 13, wherein the reporting criteria specifies one or more mobile ID numbers for RF devices from which reports are to be requested.

18. The network of claim 13, wherein the reporting criteria specifies one or more frequencies for which reports are to be requested.

19. The network of claim 13, wherein the reporting criteria specifies at least one band class for which reports are to be requested.

20. The network of claim 13, wherein the reporting criteria specifies a single report or periodic reports.

21. The network of claim 13, wherein the assessment includes a plot showing RF network quality for a plurality of locations served by the network.

22. The network of claim 13, wherein the network application selectively adjusts system parameters impacting RF performance according to the assessment.

23. The network of claim 13, wherein the network application broadcasts the reporting criteria to the RF devices using at least one short message and wherein the at least one reporting RF device send the RF quality information using short messages.

* * * * *